June 10, 1969 W. W. PHARIS 3,449,524
PREPAY COIN ADAPTER
Filed July 22, 1966
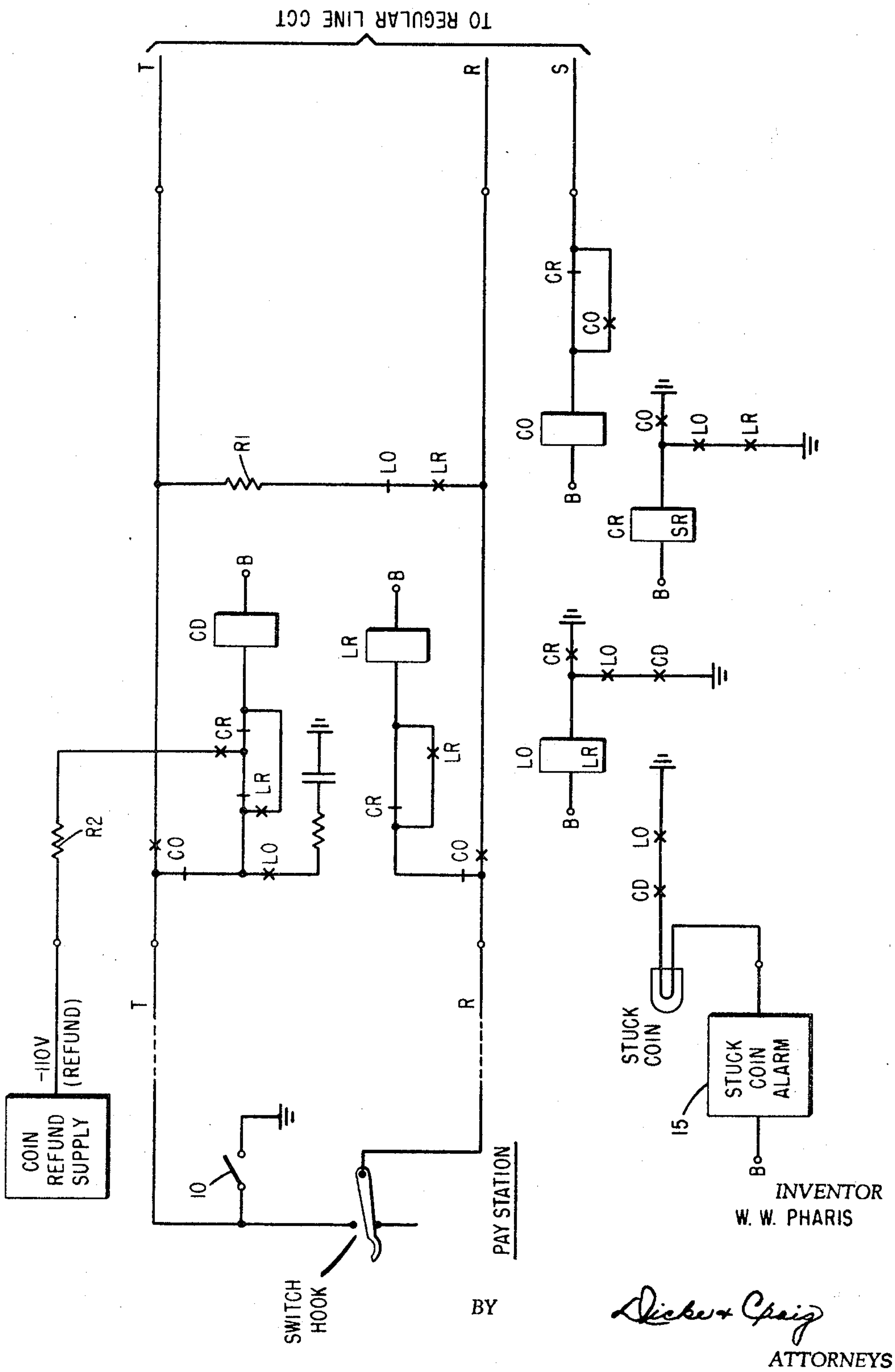
INVENTOR
W. W. PHARIS
BY Dicker + Craig
ATTORNEYS United States Patent Office
3,449,524
Patented June 10, 1969

3,449,524
PREPAY COIN ADAPTER
William W. Pharis, Rochester, N.Y., assignor to Stromberg-Carlson Corporation, Rochester, N.Y., a corporation of Delaware
Filed July 22, 1966, Ser. No. 567,158
Int. Cl. H04m *17/02*
U.S. Cl. 179—6.3 9 Claims

ABSTRACT OF THE DISCLOSURE

A prepay coin adapter for use in pay station telephone equipment providing line lockout in the event of a stuck coin at the pay station and permitting subscriber initiated automatic release of a stuck coin each time the switch hook is flashed.

The present invention relates in general to communication systems and more particularly to a prepay coin adapter for use in connection with prepay telephone communication equipment.

Pay station telephone equipment includes means for receiving, detecting the presence of, and holding coins deposited therein for purposes of obtaining access to a telephone line circuit. In the normal pay station equipment, detection of the proper coins is necessary to completion of the line circuit connection to the pay station equipment and return of dial tone for purposes of effecing a telephone call. In addition, means must be provided in the case of a "no charge" call, such as a request for information, or call to the telephone company, for which there is no charge, or an incomplete call in the case of a busy line condition or malfunction of the telephone equipment, to provide for refund of the coins deposited.

In manually operated telephone switchboard equipment, the functions of coin collecting and coin refunding are performed by selective operation of appropriate keys at the switchboard by the operator in response to the proper conditions determined by the operator. However, in automatic telephone equipment, means must be provided for automatically performing the functions of coin collecting, coin refunding and coin detection in the pay station equipment. The present invention is designed to perform these functions automatically.

The prepay coin adapter of the present invention is usable in any telephone system with prepay coin service to eliminate the need for coin refund in the regular coin control equipment and to provide line lockout in the event of a stuck coin at the pay station to avoid holding of the expensive common control equipment under these circumstances. The circuit also provides for detection of the initial coin deposit to prevent connection to the switching equipment if no coin is deposited in an originating call, and also provides means for effecting, under certain conditions, an automatic release of a stuck coin through action of a telephone subscriber.

It is an object of the instant invention to provide a new and improved prepay coin adapter for use with telephone equipment.

It is a further object of the instant invention to provide a prepay coin adapter providing automatic coin refund so as to eliminate the need for coin refund supervision in expensive common control equipment.

It is a further object of the instant invention to provide a prepay coin adapter which effects automatic coin deposit detection in the line circuit, blocking access to common switching equipment until the coin is deposited.

It is a further object of the instant invention to provide a prepay coin adapter including a stuck coin lockout arrangement providing automatic refund pulses activated by switch hook flashes to permit under certain circumstances a release by the subscriber of the stuck coin thereby freeing the line circuit without requirement for more complicated maintenance.

These and other objects, features and advantages of the present invention will become more apparent from the following detailed description of the invention, when taken in conjunction with the accompanying drawing, which discloses one embodiment of the present invention, and wherein the sole figure represents a schematic diagram of the circuit provided in accordance with the invention.

Referring now to the drawing, the transmission leads T and R illustrated interconnect the subscriber equipmet with the line circuit and these transmission lines are switched progressively in the well-known manner until connection is effected between the calling subscriber and called subscriber line circuit. The line relay LR normally found in the line circuit is connected between the ring lead R and a battery source B through various combinations of relay contacts to be described in greater detail hereinafter. A coin detect relay CD is also provided and is connetced between the tip lead T and the battery source B through other combinations of relay contacts. A cut off relay CO is also provided with its normal association in the line circuit connected between the battery source B and the sleeve lead S connected to a register, first selector, or the like in the convention manner.

In accordance with the present invention, there is provided in conjunction with the line circuit a coin refund relay CR which as indicated hereinafter serves to connect the normal 110 volt refund potential to the tip lead T to the subscriber equipment under the proper conditions. The relay CR is a slow release relay having a release delay time of at least 500 milliseconds. Associated with the relay CR is a lock out relay LO which serves to prevent associataion of the line circuit with common switching equipment in the event of a stuck coin condition.

The features of the present invention may be more easily understood from a detailed description of the operation thereof. Since the subscriber equipment with which the present invention is associated is pay station equipment, an off hook condition resulting in closing of the switch hook contact with the normal DC loop closed across the associated pay station line will not activate the conrol relays in the line circuit since both the coin detect relay CD and the line relay LR are connected to a common battery source B. However, deposit of a coin in the pay station equipment unbalances the line by closing ground through the coin magnet at the pay station, represented by switch 10, to the electrical midpoint of the line loop so that the DC path is effected from ground through the relays CD and LR to the battery source B. This energizes both the coin detect relay CD and the line relay LR completing a DC bridge across the T and R leads through the resistor R1 to the regular line circuit to cause its seizure.

As soon as the associated line circuit is extended into the switching system to a register, first selector or the like, the cut off relay CO is operated in the normal manner through extension of a ground back along the sleeve lead S to the relay. Upon energization of the cut off relay CO, the circuit to the coin refund relay CR will be completed through contacts of the CO relay to ground, energizing this relay, which in turn completes the circuit from the lock out relay LO through the contacts of the CR relay to ground energizing this relay also. The energization of the the cut off relay CO also disconnects the coin detect relay CD and the line relay LR from the T and R leads, respectively, due to the open contacts of the CO relay in the lines connected thereto and provides connection of the T and R leads from the subscriber equipment through the closed contacts of the CO relay to the line circuit. At the same time energization of the lock out relay LO opens the DC bridge through resistor R1 which extends across the T and R leads and which contains the open contacts of the energized LO relay. This is permissive since a DC bridge is already provided at the subscriber equipment across the T and R leads, which bridge is extended into the line circuit through actuation of the CO relay, held by the ground extended from the switching equipment. Thus, as a result of energization of the cut off relay CO, the coin detect relay CD and the lock out relay LR will be disabled leaving only the CO, CR and LO relays operated.

Energization of the CR relay serves to apply a negative 110 volt refund signal from a coin refund voltage supply through a resistance R2 and the closed contacts of the CR relay to the lead extending from the tip lead T to the coin detect relay CD. This voltage is prevented from reaching the CD relay due to the interposed open contacts of the energized CR relay. The energization of the cut off relay CO also prevents this refund signal at this time from reaching the tip lead T. However, upon disconnection by the calling subscriber, the circuit to the cut off relay CO is opened due to loss of the holding ground, which opens the circuit to the coin refund CR. However, this relay being a slow release relay will remain energized after the cut off relay CO is de-energized. Under these conditions, the negative 110 volt refund signal is extended during the delay time as a voltage impulse through to the tip lead T by way of closed contacts of the de-energized LR and CO relays where it is applied back to the subscriber equipment effecting refund to any coin left in the pay station. The slow release feature of the CR relay also insures a long enough pulse for refund of the coins which must be collected at other points in the system. Such as special prepay coin control circuits or trunk circuits. When the relay CR finally restores, it opens the connection from ground to the relay LO. At this point, if the coin detect relay CD is not energized, the lock out relay LO will be de-energized returning the line to normal.

However, if there is a coin stuck in the mechanism at the pay station, the ground applied to the tip lead T through the coin magnet at the pay station will remain after coin refund is attempted through application of the negative 110 volt signal to the lead T. This will provide a complete circuit from ground through the closed contacts of de-energized relays CO, LR, and CR and the coin detect relay CD to voltage source B which will energize relay CD and will hold the lock out relay LO against de-energization due to the contacts of the CD relay connected thereto when the coin refund relay CR releases. As long as the lock out relay LO remains energized, the DC bridge through the resistance R1 connected between the leads T and R will remain open so that subsequent attempts to obtain a line circuit at the pay station by going off hook will be unsuccessful, thereby preventing further seizure of the regular line circuit until the stuck coin condition is alleviated. In addition, simultaneous actuation of the coin detect relay CD and the lock out relay LO indicates a stuck coin condition and serves to actuate stuck coin alarm 15 which provides a visual and/or audio indication of this malfunction.

As indicated above, no calls can be originated at the pay station having the stuck coin condition until the coin is cleared; however, each time the handset at the pay station is lifted closing the switch hook contacts, the line relay LR operates due to connection of the ring lead R through the coin magnet switch 10 to ground. Actuation of the line relay LR simultaneously with actuation of the lockout relay LO will complete the circuit through the coin refund relay CR, once again causing an impulse of the refund potential to be applied to the tip lead T to the subscriber equipment, repeating actuation of the coin release mechanism. Thus, repeated lifting of the handset at the subscriber equipment or flashing thereof in an attempt to obtain a line circuit or refund of a deposited coin results in the application of a plurality of release pulses to the subscriber equipment, which pulses may eventually serve to release the stuck coin and restore normal operation. As soon as the stuck coin is cleared from the locked out pay station, ground is immediately removed from the lead T which results in release of the coin detect relay CD, which in turn releases the lockout relay LO to restore the line to normal service.

It should therefore be apparent that the present invention provides a prepay coin adapter having automatic coin refund each time the subscriber circuit is released to eliminate the need for coin refund supervision in expensive common control equipment. In addition, the circuit of the present invention provides for automatic coin deposit detection in the line circuit, providing inherent stuck coin detection and automatic control of the equipment to block access to common switching equipment until the stuck coin is released. However, in addition to the detection of the malfunction in the equipment, the circuit of the present invention inherently provides means whereby lifting of the handset or flashing of the equipment by the subscriber serves to continuously actuate the coin release mechanism in the equipment, which may free the stuck coin and return normal service without special action by the telephone company maintenance personnel.

While I have shown and described several embodiments in accordance with the present invention, it is understood that the same is not limited thereto but is susceptible of numerous changes and modifications as known to a person skilled in the art and I therefore do not wish to be limited to the details shown and described therein, but intend to cover all such changes and modifications as are encompassed by the scope of the appended claims.

I claim:

1. In combination with prepay telephone communication equipment including a voltage source, first and second transmission lines, switch hook means for interconnecting said first and second transmission lines, coin receiving means connected to said first transmission line for connection of ground thereto upon actuation thereof and for effecting release of coins therein upon application of predetermined voltage level thereto, a coin detect relay connected to said voltage source, a line relay connected to said voltage source, a cut-off relay normally connecting said coin detect relay to said first transmission line and said line relay to said second transmission line in the de-energized condition thereof, third and fourth transmission lines upon actuation of said line relay, said cut-off relay disconnecting said coin detect relay and said line relay from said first and second transmission lines, respectively, and connecting said first and second transmission lines to said third and fourth transmission lines, respectively, upon actuation thereof.

2. The combination defined in claim 1 further including a coin refund voltage suppy of said predetermined voltage level and a coin refund relay energized by said cut-off relay and having a slow release time as compared to said cut-off relay, said coin refund relay connecting said refund voltage supply to said first transmission line subsequent to release of said cut-off relay.

3. The combination defined in claim 2 further including lock-out relay means actuated by said coin refund relay for preventing interconnection of said third and fourth transmission lines upon actuation of said line relay, said lock-out relay means being held in the actuated condition by subsequent actuation of said coin detect relay.

4. The combination defined in claim 3 further including alarm means for providing an alarm in response to coordinate actuation of said coin detect relay and said lock-out relay means.

5. An automatic coin refund device for use in conjunction with prepay telephone communication equipment including first and second transmission lines extending between line circuits comprising a coin receiving means responsive to a coin release signal for releasing coins held thereby, switch hook means interconnecting said first and second transmission lines for initiating extension of said transmission lines to a line circuit, and relay means responsive to opening of said switch hook means for applying a coin release signal to said coin release means, further including lock-out means responsive to failure of said coin receiving means to release coins therein upon receipt of a coin release signal for preventing use of said transmission lines.

6. The combination defined in claim 5 wherein said relay means includes a coin detect relay actuated by said coin receiving means for enabling said lock-out means subsequent to application of a coin release signal to said coin receiving means by said relay means.

7. The combination defined in claim 6 wherein said switch hook means includes a line relay for initiating extension of said transmission lines to a line circuit and a cut-off relay for releasing said line relay after extension is completed.

8. The combination defined in claim 7 wherein said relay means includes a coin refund relay actuated by said cut-off relay and means providing a coin release signal connected to said coin receiving means by actuation of said coin refund relay and release of said cut-off relay.

9. The combination defined in claim 8 wherein said lock-out means is actuated by said coin refund relay and held after actuation by actuation of said coin detect relay.

References Cited

UNITED STATES PATENTS

| | | | |
|---|---|---|---|
| 1,569,623 | 1/1926 | Dunham | 179—6.3 |
| 3,027,424 | 3/1962 | Breed | 179—6.3 |

KATHLEEN H. CLAFFY, *Primary Examiner.*

J. S. BLACK, *Assistant Examiner.*